(12) United States Patent
Clark

(10) Patent No.: US 8,882,409 B2
(45) Date of Patent: Nov. 11, 2014

(54) SHELF PIN HOLE JIG

(75) Inventor: Scott L. Clark, Boone, IA (US)

(73) Assignee: Kreg Enterprises, Inc., Huxley, IA (US)

( * ) Notice: Subject to any disclaimer, the term of this patent is extended or adjusted under 35 U.S.C. 154(b) by 528 days.

(21) Appl. No.: 13/020,277

(22) Filed: Feb. 3, 2011

(65) Prior Publication Data

US 2012/0201621 A1     Aug. 9, 2012

(51) Int. Cl.
| | | |
|---|---|---|
| B23B 49/02 | (2006.01) | |
| B23B 47/28 | (2006.01) | |
| B25H 3/00 | (2006.01) | |

(52) U.S. Cl.
CPC ............... B23B 49/023 (2013.01); B23B 49/02 (2013.01); B23B 47/287 (2013.01); B25H 3/003 (2013.01)
USPC ....................... 408/1 R; 408/72 B; 408/115 R

(58) Field of Classification Search
USPC ............. 408/1 R, 72 B, 79, 97, 115 B, 115 R
See application file for complete search history.

(56) References Cited

U.S. PATENT DOCUMENTS

| | | | | |
|---|---|---|---|---|
| 2,483,686 | A * | 10/1949 | Wing ........................... | 408/72 R |
| 2,548,197 | A * | 4/1951 | Conner ........................... | 33/562 |
| 3,053,121 | A * | 9/1962 | Proctor ......................... | 408/108 |
| 3,097,891 | A * | 7/1963 | Brideau .......................... | 384/31 |
| 3,782,847 | A * | 1/1974 | Kulzer .......................... | 408/1 R |
| 4,270,259 | A * | 6/1981 | Tichy et al. ................. | 29/402.06 |
| 4,952,101 | A * | 8/1990 | Coombs ..................... | 408/115 R |
| 5,163,791 | A * | 11/1992 | Norton ............................ | 408/79 |
| 5,807,034 | A * | 9/1998 | Perlmutter et al. ............. | 408/67 |
| 6,394,713 | B1 * | 5/2002 | Yates, Sr. .................. | 408/115 R |
| 6,726,411 | B2 * | 4/2004 | Sommerfeld et al. ........ | 408/1 R |
| 7,641,425 | B2 * | 1/2010 | Sommerfeld et al. .... | 408/115 R |
| 2007/0201961 | A1 * | 8/2007 | Chiang ..................... | 408/115 R |
| 2009/0191015 | A1 * | 7/2009 | Quinn ....................... | 408/115 R |

FOREIGN PATENT DOCUMENTS

| | | | | | |
|---|---|---|---|---|---|
| FR | 2669251 A1 | * | 5/1992 | ............. | B23B 49/02 |
| GB | 2288356 A | * | 10/1995 | ............. | B23B 47/28 |
| SU | 1093428 A | * | 5/1984 | ............. | B23B 49/02 |
| SU | 1618519 A | * | 1/1991 | ............. | B23B 49/02 |

* cited by examiner

*Primary Examiner* — Daniel Howell
*Assistant Examiner* — Michael Vitale
(74) *Attorney, Agent, or Firm* — Zarley Law Firm, P.L.C.

(57) ABSTRACT

A shelf pin hole jig for drilling shelf pin holes having a main body and an alignment member removably connected to the main body for aligning the jig. The main body has a plurality of guide channels with hardened guide inserts for receiving and guiding a drill bit with a stop collar. Removably connected to either side of the main body is an alignment member which extends below the main body and is used for alignment of the jig. The main body also has a plurality of compartments for holding drill bits and alignment pins.

19 Claims, 3 Drawing Sheets

SHELF PIN HOLE JIG

BACKGROUND OF THE INVENTION

This invention is directed towards a wood working jig. More particularly and without limitation, this invention is directed towards a wood working jig for making shelf holes.

Various shelving systems are old and well known in the art. Common shelving systems are made of wood, pressboard, plywood or other composite materials and are manufactured by screwing an opposing top and bottom to opposing sidewalls so as to form a frame. Once this frame is assembled the shelves are then glued and screwed in place. While this manufacturing method produces a sturdy and rigid shelving system the shelves are permanently affixed and therefore can not be easily moved.

To allow for variable shelf spacing, shelf pin hole systems were developed. These systems utilize a plurality of shelf pin holes which are drilled into the interior surface of the opposing sidewalls. Most often, these shelf pin holes are drilled at varying heights in two columns on each sidewall, each column spaced inwardly from the respective front and back edge of the sidewall. To position a shelf using this system, a user selects a height for the shelf and inserts a shelf pin into each of the four corresponding shelf pin holes for that height. The shelf pin holes matingly and frictionally receive the shelf pins which partially extend outwardly from the shelf pin holes. The shelf is then placed on top of the outwardly extending shelf pins thereby providing support in each corner of the shelf. This system allows the user to vary the spacing of the shelves by simply selecting a different row of shelf pin holes.

Manufacturers of shelving systems often drill these shelf pin holes into the interior surfaces of the sidewalls as part of the manufacturing process. While this is convenient, many times additional shelf pin holes are necessary or desired, such as in the case of an existing shelf pin tearing-out, or when the pattern of shelf pin holes are not at the desired location. To assist in drilling these additional shelf pin holes, various shelf pin hole jigs have been developed.

A common conventional shelf pin hole jig comprises a flat piece of plastic or composite material having a plurality of holes spaced therein. This flat device is then laid against the interior surface of the sidewall of the shelving system and a shelf pin bit is used to drill the shelf pin holes. While somewhat effective, problems exist in this process. First, the conventional shelf pin hole jig which comprises merely of a flat body is difficult to properly and accurately align and the jig provides very little guidance for the drill bit which makes it difficult to properly place the hole shelf pin hole, and easy to angularly misalign the shelf pin hole. In addition, these jigs require the use of a specially designed, complex, expensive and difficult to use shelf pin bit that has multiple moving parts. Using these shelf pin bits is undesirable as they often can break or malfunction because of wood chips getting stuck in the moving parts of the bit. In addition, these shelf pin bits are long in length which is also undesirable as many times space is limited when drilling shelf pin holes.

Therefore, an objective of the invention is to provide a shelf pin hole jig that is more easily and accurately aligned than conventional jigs.

Another objective of the invention is to provide a shelf pin hole jig that allows for easier and more accurate alignment of the shelf pin hole itself.

Another objective of the invention is to provide a shelf pin hole jig that is more economical than prior art jigs.

These and other objectives will be apparent to those skilled in the art from the following description, drawing and claims.

BRIEF SUMMARY OF THE INVENTION

A shelf pin hole jig for drilling shelf pin holes having a main body and an alignment member removably connected to the main body for aligning the jig. The main body has a plurality of guide channels with hardened guide inserts for receiving and guiding a drill bit with a stop collar. Removably connected to either side of the main body is an alignment member which extends below the main body and is used for alignment of the jig. The main body also has a plurality of compartments for holding drill bits and alignment pins.

DETAILED DESCRIPTION OF THE PREFERRED EMBODIMENT

Figure 1:
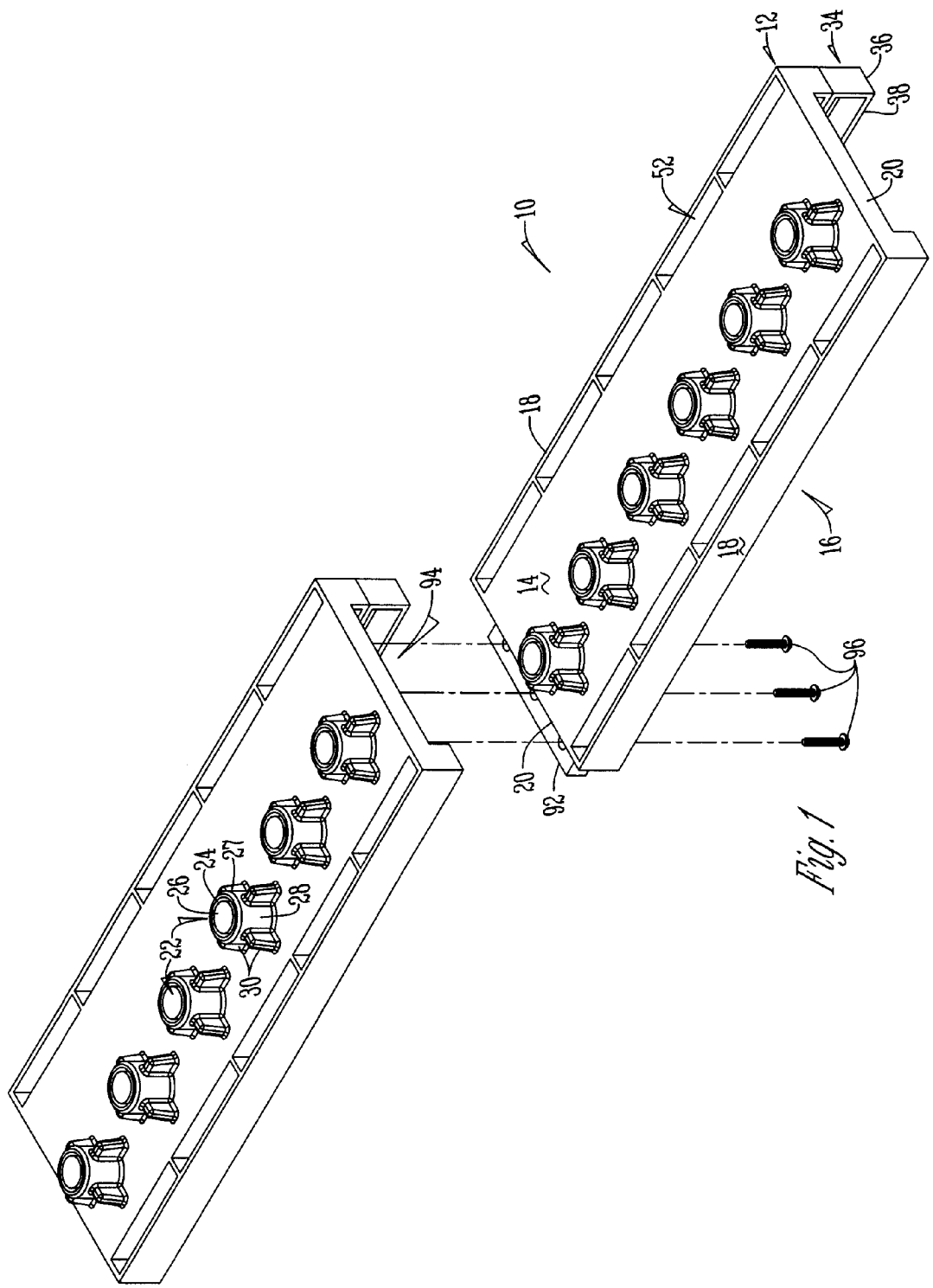
FIG. 1 is a perspective blown up view of two shelf pin hole jigs in end to end alignment.
Figure 2:
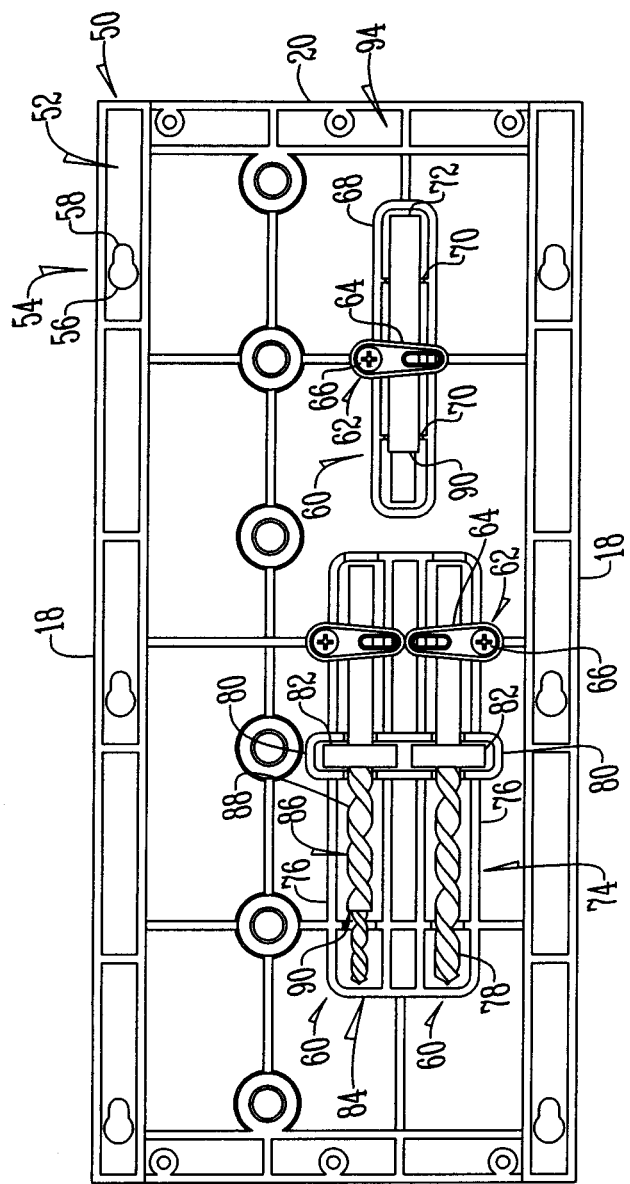
FIG. 2 is a plan view of the bottom of a shelf pin hole jig.
Figure 3:
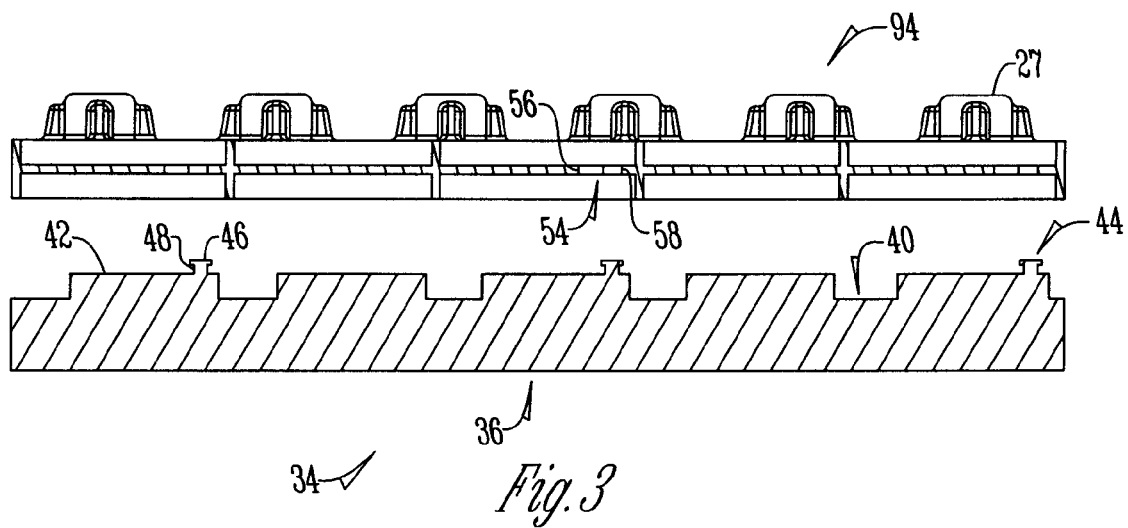
FIG. 3 is a plan view of the side of a blown up shelf pin hole jig.
Figure 4:
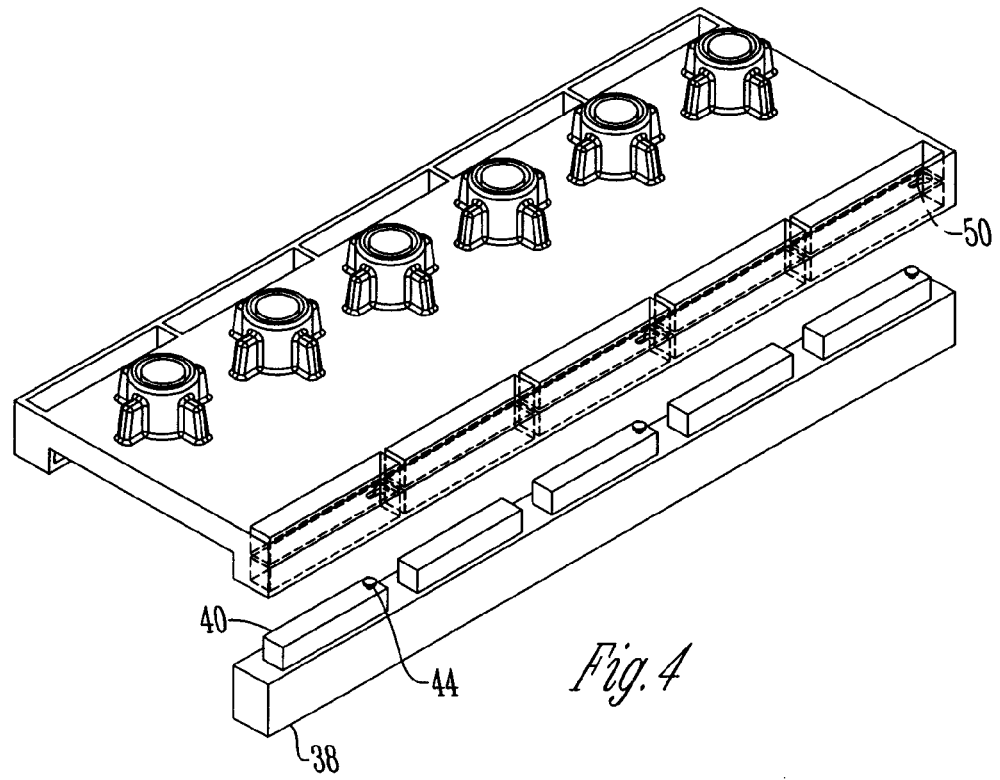
FIG. 4 is a perspective view of a blown up shelf pin hole jig.

With reference to the figures, a shelf pin hole jig 10 has a main body 12. Main body 12 has a top side 14, a bottom side 16, opposing side surfaces 18 and opposing first and second ends 20. In a preferred embodiment, main body 12 takes on a generally rectangular shape with opposing side surfaces 18 and opposing first and second ends 20 being in parallel spaced alignment with one another; with side surfaces 18 being in perpendicular alignment with first and second ends 20. In a preferred embodiment side surfaces 18 and ends 20 are generally straight and flat so as to assist with easy alignment with work pieces however any other shape is contemplated. Preferably main body 12 is formed out of an injection molded plastic, thermoplastic or other composite material or the like material. Alternatively, main body 12 is formed or machined out of a solid piece of material such as a metal, plastic or like material.

Extending through main body 12 from top side 14 to bottom side 16 is a plurality of guide channels 22. Each guide channel 22 extends through main body 12 in perpendicular alignment with the top surface 14 and bottom surface 16. The bottom edge of each guide channel 22 is generally flush with, or within a close tolerance of, bottom surface 16 of the main body 12 so as to improve the quality of a drilled hole and prevent hole tear-out. In contrast, the top edge of each guide channel 22 extends outwardly and above the top 14 surface of main body 12. The plurality of guide channels 22 extend in parallel spaced alignment with side surfaces 18 and extend from first end to second end 20 of main body 12.

Each channel 22 has a hardened metallic guide insert 24 having a central bore 26 which is cylindrical in shape. The top edge of each guide insert 24 terminates in a shelf or lip 27 which extends outwardly in perpendicular alignment to central bore 26 as does the bottom edge of guide insert 24. Lip 27 provides an extended stop surface so as to engage and stop a stop collar on a drill bit positioned within bore 26. Similarly the bottom edge of guide insert assists in drilling a clean hole by having an extended surface in contact with or in close tolerances of the work piece. In a preferred embodiment, the center of the bore 26 of guide channels 22 are positioned in equal spacing to one another, such as 1-inch apart. However in an alternative arrangement spacing of the guide channels 22 varies. Also in a preferred embodiment guide channels 22 are positioned more closely to one of the side surfaces 18 than they are the other.

Each guide insert 24 is connected to the main body 14 by supporting material 28 which surrounds and holds the guide insert 24 in place as well as provides required structural integrity to the device 10. In one embodiment, the top edge and bottom edge of the guide inserts 24 and supporting material 28 are in parallel alignment thereby providing an extended stop surface 27. To further add rigidity, support members 30 extend outwardly from support material 28 which further connect support material 28 and guide channel 22 to main body 12. These support members 30 are located on both the top surface 14 and the bottom surface 16 and preferably extend outwardly from the guide channel 22 in perpendicular alignment to one another. Preferably four support members 30 extend out of each guide channel 22 however more support members 30, such as 5, 6 or more are contemplated as are less support members 30 such as 3, 2 or 1.

Removably connected to main body is alignment member 34. Alignment member 34 is generally rectangular in shape and preferably extends the length of side surface 18 of main body 12 and when in locked position the ends 20 of alignment member 34 are flush with the ends 20 of main body 12. Alignment member 34 is preferably connected to the bottom side 16 of main body 12 however alignment member is attached to the side surface 18 or any other portion of main body 12 in other arrangements. Alignment member 34 has a flat bottom surface 36, a flat interior edge or alignment edge 38 and a top surface 40 having a plurality of extension members 42 extending upwardly therefrom. In one embodiment the center of bore 26 of each guide channel 22 is positioned 1-inch inward from alignment edge 38 on one side of main body 12, and 2-inches inward from alignment edge 38 on the opposing side of main body 12. In an alternative arrangement guide channels 22 extend down the center of main body 12 or at any other spacing in relation to opposing side surfaces 18. Extension members 42 preferably are narrower than alignment member 34 and are preferably rectangular in shape and are in spaced alignment with one another.

Connected to the extension members 42 is a snap locking feature 44 which is used to connect alignment member 34 to main body. Any locking feature capable of connecting one device to another is contemplated such as snapping members, frictionally engaging members, screws, nuts and bolts, or the like. In one example, locking feature 44 has a circular disk 46 connected to the top of a narrower support column 48. Locking members 44 are preferably positioned towards one end of each extension member 42, or alternatively every other extension member 42.

Extending along each side surface 18 of main body 12 are locking channels 50. Locking channels 50 have a plurality of recesses 52 positioned in the bottom side 16 of main body 12 which are of any size and shape to matingly and frictionally receive extension members 42. As one example, if extension members 42 are rectangular in shape, recesses 52 are similarly rectangular in shape. In addition, the top side 14 of locking channels 50 also have recesses 52 positioned therein which correspond to the recesses positioned in the bottom side 16 of the main body 12. The recesses 52 in the top side 14 provide needed space for the locking member 44 to slide into place unimpeded by a user's hand when assembling the device.

Positioned in the top surface of recesses 52 is a key hole 54 which is sized and shaped to receive snap locking feature 44. Like locking feature 44, keyhole 54 is positioned towards one end of each recess 52 so as to match the placement of locking feature 44. In a preferred embodiment, key hole 54 has a first opening 56 which is connected to a narrower second opening 58. First opening 56 is sized to allow disk 46 to pass therethrough, whereas second opening 58 is sized to frictionally and lockingly receive support column 48 but not allow disk 46 to pass therethrough. In this way, key hole 54 lockingly retains snap locking feature 44 in place.

Also positioned on the bottom side 16 of main body 12 are a plurality of compartments 60 or holding and retaining tools and other objects which are used in the shelf pin hole drilling process. Any number of compartments 60 are used, each compartment 60 having a cover 62 which is removably placed over compartment 60 so as to hold the contents therein. Cover 62 preferably is flush with or does not extend beyond the bottom plane 16 of main body 12. Cover 62 has rotating paddle 64 which is connected to main body 12 and frictionally held in place by way of locking screw 66. Rotating paddle 64 rotates between a first position where objects are removable and replaceable within the compartment and a second position where rotating paddle 64 covers compartment 60 thereby holding objects therein. As one example, main body 12 has a first compartment 68 which is generally rectangular in shape.

First compartment 68 has at least one and preferably two cradles 70 extending across compartment 68. Each cradle 70 has a semi-circular cut-out positioned therein so as to matingly receive, retain and hold relocation pin member 72 in place. As another example, main body 12 has a second compartment 74 which has a first section 76 which receives a shaft section of straight drill bit 78, and a second section 80 which receives a stop collar 82 connected to straight drill bit 78. As another example, main body 12 has a third compartment 84 which has a first section 76 which receives a shaft section of a stepped drill bit 86, and a second section 80 which receives a stop collar 82 connected to stepped drill bit 86.

The compartments preferably contain a relocation pin member 72, a straight drill bit 78 having a stop collar 82 and a stepped drill bit 86 having a stop collar 82. There are two most common sizes of shelf hole pins, ¼ inch and the smaller 5 mm. To facilitate the use of shelf pin hole jig 10 with both sizes of common shelf hole pins, the main shaft section of relocation pin member 72, straight drill bit 78 and stepped drill bit 86 match the larger ¼ inch diameter, which also preferably matches the diameter of bore 26 of guide channels 22 within a close tolerance. This close tolerance of the shafts of these devices 72, 78, 86 holes to accurately guide the drill bits 78, 86 or relocation pin member 72 thereby forming a more accurate shelf pin hole. Relocation pin 72 and stepped drill bit 86 each have a step 90 wherein the shaft transitions from ¼ inch to the narrower 5 mm format.

A connecting member 92 is connected to the bottom side 16 of each end 20 of main body 12 and extends outwardly from end 20 so as to connect two main bodies 12 in end to end relation. Connecting member 92 is any size and shape capable of facilitating the connection of two main bodies 12 in end to end relation. However, in a preferred embodiment, connecting member 92 is rectangular in shape and is matingly received by notch 94 positioned within end 20. When in position, connecting member 92 is flush with the bottom surface 16 of main body 12. Connecting member 92 is removably and replaceably connected to main body 12 by any means known in the art such as a snap fit, screws or the like, however a plurality of locking pins 96 which pass through connecting member 92 and are received by main body 12 are preferably used. In this way two main bodies 12 are connected in end to end relation through the use of connecting member 92.

In operation, the user determines whether the user wants the setting where the shelf pin holes are closer to the edge of the workpiece or farther from the edge of the work piece. Based on this determination the user selects a side 18 of main body 12 to attach alignment member 34. This is accomplished by inserting the extension members 42 of alignment member 34 into the corresponding recesses 52 of locking channel 50. The user then inserts disk 46 of snap locking feature 44 through the larger first opening 56 of the key hole 54. Once this is accomplished, the user slides the alignment member 44 towards the smaller second opening 58 until the snap locking feature 44 is locked, or snapped into place. When doing so, alignment member 44 is locked in place by key hole 54 as the second opening 58 frictionally holds support column 48 and prevents disk 46 from passing therethrough. When in place, ends 20 of the alignment member 44 is flush with ends 20 of main body 12.

Next, the user sets the bottom surface 16 of main body 12 on the workpiece and aligns the interior edge 38 of alignment member 34 along the edge of the workpiece so that both the bottom surface 16 of main body 12 and interior edge 38 of alignment member 34 are in flush contact with the workpiece. If using an existing shelf pin hole to align the jig 10, the user then inserts relocation pin member 72 through the bore 26 of a guide channel 22.

Whether the user inserts the stepped end 90 non-stepped end of the relocation pin member 72 depends on the size of the existing shelf pin hole. Once properly aligned, the user drills the desired shelf pin holes. To do so, the user selects whether to use the straight drill bit 78 or the stepped drill bit 86. Once the proper drill bit is selected and installed on a drill motor, the user drills the shelf pin hole by passing the drill bit 78, 86 through each of the guide channels 22 until the stop collar 82 engages the top surface of guide channel 22, or lip 27.

The depth of the shelf pin hole is set by the combination of the stop collar 82, the length of the shaft 88 and the length of the guide channel 22. The stop collar 82 is either permanently affixed to the shaft 88 of drill bit 78, 86 thereby setting the length of shaft 88; alternatively, stop collar 82 is adjustable on shaft 88. When stop collar 82 is adjustable on shaft 88, stop collar 82 is held in place by an adjustable locking mechanism (not shown) such as a locking screw or a plurality of locking screws, or the like, that pass through the stop collar 82 and engage the shaft 88 thereby adjustably setting the depth of the shelf pin hole. The depth can easily be set using the shelf pin hole jig 10 by placing the drill bit 78, 86 into a compartment 68, 74 and adjusting the stop collar 82 to be positioned within second section 80 with shaft 88 held within cradle 70. Due to the close tolerances of compartments 68, 74, once shaft 88 is positioned within cradle 70 and stop collar 82 is positioned within second section 80 the depth of the stop collar 82 is matched to the shelf pin hole jig 10 and more specifically to the length of channels 22. Once in this position the stop collar 82 is locked in place on shaft 88 in its optimal position.

Accuracy of the angle of the shelf pin hole is maintained by close tolerances between the guide channel 22 and the shaft of each of the relocation pin member 72, the straight drill bit 78, and the stepped drill bit 86; this is true even when drilling shelf pin holes that are smaller than the bore 26 of the guide channels 22 through the use of the stepped relocation pin member 72 and the stepped drill bit 86. That is, while the portion of the pin 72 or drill bit 86 that actually goes into the shelf pin hole may be smaller than the bore 26, the portion of the pin 72 or drill bit 86 that engages the bore 26 of guide channel 22 is within close tolerances thereof, thereby tightly and accurately controlling the placement of the shelf pin hole.

In another arrangement, should the user need additional shelf pin holes, the user attaches two shelf pin hole jigs 10 in end to end relation through the use of connecting member 92. In this arrangement, the user inserts connecting member 92 into notch 94 on the bottom side 16 of main body 12. The user then inserts locking pins, screws, bolts or the like 96 through connecting member 92 and into main body 12 thereby locking connecting member 92 to the first main body. This process is then repeated for the second main body 12. This results in a pair of main bodies 12 being aligned and connected in end-to-end relation which allows a user to drill an extended array of shelf pin holes without having to relocate the jig 10.

From the foregoing description it is apparent that a shelf pin hole jig is presented that is more easily and accurately aligned than conventional jigs, and does not require the use of a complicated shelf pin bit with multiple moving parts, as well as meeting other goals and objectives.

It will be appreciated by those skilled in the art that other various modifications could be made to the device without parting from the spirit and scope of this invention. All such modifications and changes fall within the scope of the claims and are intended to be covered thereby.

What is claimed is:

1. A shelf pin hole jig for drilling shelf pin holes comprising:
   a main body having a top side and a bottom side;
   the main body extending a length between an opposing first end and a second end, and extending a width between an opposing first side and a second side;
   the main body having a plurality of guide channels which extend through the main body;
   an alignment member removably and replaceably connectable to the first side and the second side of the main body;
   wherein the alignment member snaps into place adjacent the first side or the second side of the main body.

2. The shelf pin hole jig of claim 1 wherein each guide channel has a guide insert.

3. The shelf pin hole jig of claim 1 wherein the plurality of guide channels are in parallel spaced alignment with the first side and the second side of the main body.

4. The shelf pin hole jig of claim 3 wherein the plurality of guide channels are positioned closer to the first side than the second side.

5. The shelf pin hole jig of claim 1 further comprising at least one compartment on the main body.

6. The shelf pin hole jig of claim 1 further comprising at least one support member connected to one of the plurality of guide channels.

7. The shelf pin hole jig of claim 1 wherein the alignment member has a plurality of extension members extending from the alignment member.

8. The shelf pin hole jig of claim 1 wherein the alignment member is received within a plurality of recesses in the main body.

9. The shelf pin hole jig of claim 1 further comprising a connecting member connected to an end of the main body.

10. A method of using a shelf pin hole jig kit for drilling shelf pin holes comprising:
    providing a shelf pin hole jig comprising:
    a main body having a top side and a bottom side; the main body extending a length between an opposing first end and a second end, and extending a width between an opposing first side and a second side;
    the main body having a plurality of guide channels which extend through the main body;

an alignment member removably connectable to the first side and the second side of the main body;
a straight drill bit having a stop collar;
a relocation pin member;
the relocation pin member having a generally cylindrical main shaft and a generally cylindrical stepped portion wherein the main shaft has a diameter corresponding to the diameter of the plurality of guide channels, and the stepped portion has a diameter less than the diameter of the plurality of guide channels;
aligning the shelf pin hole jig with a first sized shelf pin hole by inserting the main shaft of the alignment pin into one of the plurality of guide channels and into the first sized shelf pin hole and drilling a plurality of aligned shelf pin holes using the other of the plurality of guide channels; and
aligning the shelf pin hole jig with a second sized shelf pin hole by inserting the stepped portion of the alignment pin into one of the plurality of guide channels and into the second sized shelf pin hole and drilling a plurality of aligned shelf pin holes using the other of the plurality of guide channels.

11. The method of using the shelf pin hole jig kit of claim 10 wherein the alignment member is frictionally connectable and removable adjacent the first side or the second side of the main body.

12. The method of using the shelf pin hole jig kit of claim 10 wherein the main body has at least one compartment for holding the straight drill bit.

13. The method of using the shelf pin hole jig kit of claim 10 wherein the main body has at least one compartment for holding a stepped drill bit.

14. The method of using the shelf pin hole jig kit of claim 10 wherein the main body has at least one compartment for holding the relocation pin.

15. The method of using the shelf pin hole jig kit of claim 10 further comprising wherein the alignment member snaps into place adjacent the first side or the second side of the main body.

16. A method of using a shelf pin hole jig for drilling shelf pin holes comprising the steps of:
providing a shelf pin hole jig, the shelf pin hole jig having a main body having a first side and a second side, a plurality of guide channels in the main body, and an alignment member connected to the main body;
placing the shelf pin hole jig on a work piece;
aligning the shelf pin hole jig with a shelf pin hole by inserting an alignment pin into one of the plurality of guide channels and into the shelf pin hole;
using a straight drill bit having a stop collar to drill a plurality of aligned first sized shelf pin holes using the plurality of guide channels, wherein the diameter of the shaft of the straight drill bit corresponds to the diameter of the plurality of guide channels;
using a stepped drill bit having a main shaft and a stepped portion and a stop collar to drill a plurality of aligned second sized shelf pin holes using the plurality of guide channels, wherein the diameter of the main shaft of the stepped drill bit corresponds to the diameter of the plurality of guide channels and the diameter of the stepped portion is less than the diameter of the plurality of guide channels;
wherein the alignment member is frictionally connectable and removable adjacent the first side or the second side of the main body.

17. The method of claim 16 further comprising the step of using a stepped relocation pin having a main shaft and a stepped portion to align the shelf pin hole jig wherein the diameter of the main shaft of the shelf pin hole jig corresponds to the diameter of the plurality of guide channels.

18. The method of claim 16 wherein the plurality of guide channels are offset in the main body such that they are positioned closer towards one of the first side or the second side.

19. The method of claim 18 wherein the alignment member snaps into place adjacent the first side or the second side of the main body.

* * * * *